July 29, 1924.

S. ANGELILLO

TIRE CHAIN

Filed Dec. 20, 1923

1,503,292

Inventor
Salvator Angelillo

Patented July 29, 1924.

1,503,292

UNITED STATES PATENT OFFICE.

SALVATORE ANGELILLO, OF PLANTSVILLE, CONNECTICUT.

TIRE CHAIN.

Application filed December 20, 1923. Serial No. 681,829.

*To all whom it may concern:*

Be it known that I, SALVATORE ANGELILLO, a citizen of the United States, residing in the town of Plantsville, borough of Southington, in the county of Hartford and State of Connecticut, have invented certain new and useful Improvements in a Tire Chain, of which the following is a specification.

The invention relates to an automobile tire chain and more particularly to that part which goes across the tire and takes the wear from the road.

One object of the invention is to provide two chains held together by auxiliary connecting links in such a way that the wear from the highway will be taken along practically the whole length of each corresponding link of the two chains, instead of a small section of each link as is the case where a single chain is used.

Another object is to provide a means to keep a broken link from beating against a mud guard when a car is in motion.

Figure 1:
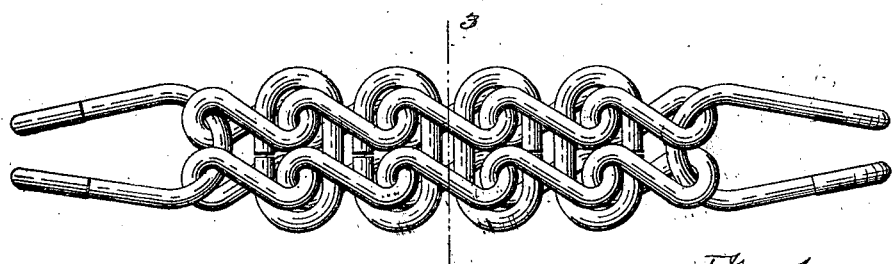
Figure 2:
Figure 3:
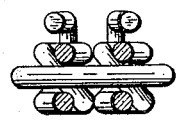

In the drawings, Figure 1 is a top view showing the double chain and auxiliary connecting links; Figure 2 is a side view and Figure 3 is a transverse section through the lines 3—3 of Figure 1.

Referring to the preferred form of the invention, the links of the two chains are held in position by means of auxiliary connecting links. One side of each of the auxiliary connecting links passes through two adjacent links of one of the two chains, and the other side of the auxiliary connecting link through the next two adjacent links of the other chain in such a way that each of the auxiliary connecting links holds four links of the two chains in position. By having an auxiliary connecting link at each end of corresponding links in the two chains, not only will the chain have the advantage of more wearing qualities and longer life due to its double linkage, but the auxiliary connecting links hold the two chains in such a position that the wear from the highway is taken along practically the entire length of each link in the two chains. By bending the connecting loops at each end of the chain it is possible to remove the chain or turn it around so that the other side of each link of the two chains will take the wear from the road. When one link is worn out or broken, the auxiliary connecting link will still hold the chain together and thus keep the broken link from striking the mud guard every time the wheel is revolved.

What I claim:

In an anti-skid tire chain, a cross chain section comprising two auxiliary links passing through each corresponding link of two cross tire chains.

In testimony whereof I affix my signature.

SALVATORE ANGELILLO.